United States Patent
Hammer

[11] 3,770,294
[45] Nov. 6, 1973

[54] PASSIVE BELT ARRANGEMENT
[75] Inventor: Kenneth C. Hammer, Warren, Mich.
[73] Assignee: General Motors Corporation, Detroit, Mich.
[22] Filed: Oct. 26, 1971
[21] Appl. No.: 192,535

[52] U.S. Cl. .......................................... 280/150 SB
[51] Int. Cl. .............................................. B60r 21/02
[58] Field of Search .............................. 280/150 SB

[56] References Cited
UNITED STATES PATENTS
3,583,726  7/1971  Linoblad ...................... 280/150 SB
3,684,310  8/1972  Weststrate .................... 280/150 SB Primary Examiner—Benjamin Hersh
Assistant Examiner—Robert R. Song
Attorney—W. E. Finken et al.

[57] ABSTRACT

A passive belt arrangement for restraining a seated occupant of a vehicle body having a door movable between open and closed positions laterally adjacent the seat carrying the occupant. The belt arrangement includes lap and shoulder belts whose outboard ends are respectively secured to the door and to the vehicle body adjacent an upper outboard portion of the seat. The inboard ends of these belts are secured to one end of a control belt whose other end is received by a belt retractor mounted on the vehicle body floor inboard and adjacent a rear portion of the seat. The belt retractor normally retracts the control belt to position the lap and shoulder belts in occupant restraining positions. A control member slidably receives an intermediate portion of the shoulder belt and attaches respective ends of first and second cables. The first cable slides through a forward portion of the vehicle body roof and is attached to the door such that door opening movement pulls the control member forwardly as the shoulder belt slides through it and moves forwardly to an easy-enter position while the belt retractor extends the control belt. The inboard ends of the lap and shoulder belts move forwardly and upwardly as the forwardly moving shoulder belt extends the control belt under the impetus of the forwardly moving control member, the net effect being to move the lap belt forwardly to an easy-enter position concomitantly with the shoulder belt without any deliberate occupant effort. A cable retractor mechanism retracts the second cable during closing movement of the door to move the control member rearwardly and allow the belt retractor to retract the control belt and concomitantly move the lap and shoulder belts to the occupant restraining positions without any deliberate occupant effort.

7 Claims, 3 Drawing Figures

PATENTED NOV 6 1973

3,770,294

PASSIVE BELT ARRANGEMENT

BACKGROUND OF THE INVENTION

This invention relates to a vehicle body passive belt arrangement including lap and shoulder belts movable without any deliberate occupant effort between occupant restraining and easy-enter positions in response to door movement.

The United States patent applications of co-inventors Charles M. Keppel and Irwin K. Weiss, Ser. No. 118,605 and Ser. No. 156,808, respectively filed on Feb. 25, 1971 and May 20, 1971 and assigned to the assignee of the present invention, the former one of which is now U.S. Pat. No. 3,680,883, disclose vehicle body passive belt arrangements in which lap and shoulder belts are moved between occupant restraining and easy-enter positions without any deliberate occupant effort in response to an operative condition of the vehicle, which condition may be the position of the vehicle door. The belt arrangements therein disclosed have the inboard ends of the lap and shoulder belts suitably fixed to the vehicle floor while the outboard ends are received by belt retractors respectively mounted on the door and an outboard portion of the vehicle roof. First and second control members slidably receive the respective intermediate portions of the belts and are moved forwardly and rearwardly along the vehicle roof and vehicle door by respective drive mechanisms to provide forward and rearward movement of the belts between the occupant restraining and easy-enter positions. If a belt arrangement generally of this type included one control member and associated drive mechanism to provide the movement of both the lap and shoulder belts, the cost of such an arrangement would be decreased from that of the above described arrangements.

SUMMARY OF THE INVENTION

This invention provides a vehicle body passive belt arrangement in which the inboard ends of lap and shoulder belts are fixed relative to each other for movement between lower rearward and upper forward positions, with these belt ends normally biased to the lower rearward positions to maintain the belts in restraining positions relative to an occupant seated laterally adjacent a door associated with the belt arrangement, and with a control member that slidably receives an intermediate portion of the shoulder belt and which moves forwardly during door opening movement to supply the impetus for moving the inboard belt ends to the upper forward positions and the belts to easy-enter positions without any deliberate occupant effort.

In the preferred embodiment of a vehicle body passive belt arrangement according to the invention, the outboard end of the lap belt is secured to the door while the outboard end of the shoulder belt is secured to the vehicle body roof rail slightly rearward of the seat. The inboard ends of the lap and shoulder belts are secured to one end of a control belt whose other end is received by a belt retractor mounted on the vehicle body floor inboard of the seat. The normal retracting bias of the belt retractor positions the lap and shoulder belts in occupant restraining positions respectively across the lap and chest of a seated occupant when the door is in closed position. A control member slidably receives an intermediate portion of the shoulder belt and attaches respective ends of first and second cables. The other end of the first cable is secured to the door while an intermediate portion is slidable through a forward portion of the roof rail to allow opening movement to pull the control member forwardly, moving the shoulder belt forwardly to an easy-enter position while the belt retractor extends the control belt to allow the inboard belt ends to move forwardly and upwardly such that the lap belt moves forwardly to an easy-enter position concomitant with the shoulder belt. A roof rail mounted cable retractor mechanism receives the other end of the second cable and pulls the control member rearwardly during door closing movement, allowing the belt retractor to retract the control belt and move the inboard belt ends rearwardly and downwardly such that the lap and shoulder belts move to the occupant restraining positions.

Accordingly, one feature of this invention is that it provides an improved vehicle body passive belt arrangement in which a control member slidably receives an intermediate portion of a shoulder belt and is moved forwardly during door opening movement to move the inboard ends of the shoulder belt and a lap belt forwardly and upwardly such that these belts move forwardly from occupant restraining positions to easy-enter positions.

Another feature of the invention is that the inboard ends of the lap and shoulder belts are secured to one end of a control belt whose other end is received by a floor mounted retractor, with the belt retractor extending the control belt as the lap and shoulder belts move to the easy-enter positions, and with the belt retractor retracting the control belt during door closing movement to move the inboard ends of the lap and shoulder belts rearwardly and downwardly to move these belts to the occupant restraining positions.

Another feature of the invention is that the control member attaches respective ends of first and second cables, with the other end of the first cable secured to the door while an intermediate portion slides through a forward portion of the roof to pull the control member forwardly and move the lap and shoulder belts to the easy-enter positions during door opening movement, and with the other end of the second cable received by a cable retractor mechanism that pulls the control member rearwardly during door closing movement to allow the retraction of the control belt by the belt retractor and the consequent movement of the lap and shoulder belts to the occupant restraining positions.

BRIEF DESCRIPTION OF THE DRAWINGS

An understanding of the invention is readily apparent from the following description of the preferred embodiment and from the drawings in which.

DESCRIPTION OF THE PREFERRED EMBODIMENT

Figure 1:
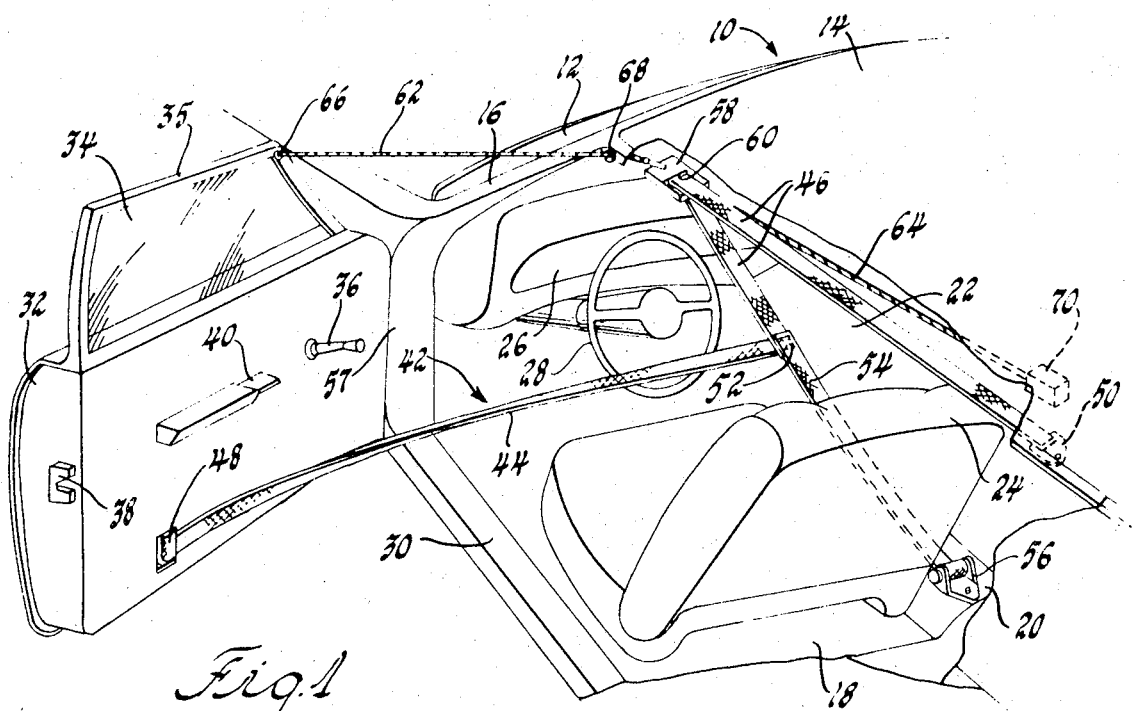
FIG. 1 is a partially broken away perspective view of a portion of a vehicle body whose door is shown in open position where the lap and shoulder belts of a passive belt arrangement, according to this invention, are positioned in forward easy-enter positions allowing convenient occupant access to a seat located laterally adjacent to the door opening.

Referring now to the drawings, a vehicle body generally indicated by 10 includes a windshield 12 whose upper edge is bounded by the forward edge of the vehicle body roof 14 and whose lateral edges are bounded by respective windshield pillars 16. The vehicle floor 18 with a conventional transmission tunnel 20 cooperates with the windshield and the roof to define an occupant compartment generally indicated by 22. A bucket type seat 24 is mounted within the occupant compartment on the floor 18 in the conventional manner rearward of an instrument panel 26 and an associated steering wheel 28. Access to seat 24 is by way of a side door opening 30 that is selectively opened and closed by a side door 32 whose forward edge is conventionally pivoted to the vehicle body 10 for swinging movement about a generally vertical axis. Door 32 conventionally supports a side window 34 for movement between a raised position within a window frame 35 and a lower hidden position within the door, the movement being controlled by a window regulator handle 36. A bolt 38 of a door lock assembly mounted on the rear edge of door 32 is conventionally engageable with a vehicle body mounted keeper, not shown, to maintain the door in closed position, while actuation of an inside remote release handle 40 or an outside push button, not shown, unlatches the bolt to selectively allow opening movement of the door.

A belt arrangement, according to this invention, is generally indicated by 42 and includes lap and shoulder belts 44 and 46, respectively. The outboard end of the lap belt 44 is received by a belt retractor 48 suitably mounted on a lower rearward portion of door 32. Belt retractor 48 may be an inertia retractor, similar to those used on current production vehicles, and allow belt extending movement only below a predetermined rate. Alternately, belt retractor 48 may be similar to the retractor disclosed in the application of Arlauskas et al., Ser. No. 145,797, filed on May 21, 1971 and assigned to the assignee of the present invention, now U.S. Pat. No. 3,692,328 and prevent extending movement of lap belt 44 when the bolt 38 is in the locked position and the inside remote release handle 40 remains unactuated, while allowing the extending belt movement upon a partial or full actuation of the inside remote release handle or an actuation of the outside push button. An attachment member 50 secures the outboard end of shoulder belt 46 to the roof rail of roof 14 slightly rearward of seat 24. The inboard ends of the lap and shoulder belts 44 and 46 are sewn to each other at 52 and to one end of a control belt 54. The other end of control belt 54 is received by a belt retractor 56 mounted on the transmission tunnel 20 adjacent a rear portion of seat 24. Belt retractor 56 also may be a conventional inertia retractor or alternately may be a retractor responsive to the position of bolt 38 and actuation on inside remote release handle 40 in a manner similar to the alternate embodiment of retractor 48. The application of Augunas et al., Ser. No. 144,470, filed On May 18, 1971 and assigned to the assignee of the present invention, discloses a door mounted belt retractor whose locking is responsive to the positions of a door lock bolt and an inside remote release handle by way of conventional flexible control cables. These flexible control cables may be adapted to extend between the door 32 and the front pillar 57 defining the forward edge of door opening 30, with the control cables extending from the pillar to the retractor 56 to provide the locking and unlocking of the retractor in the manner described.

Figure 2:
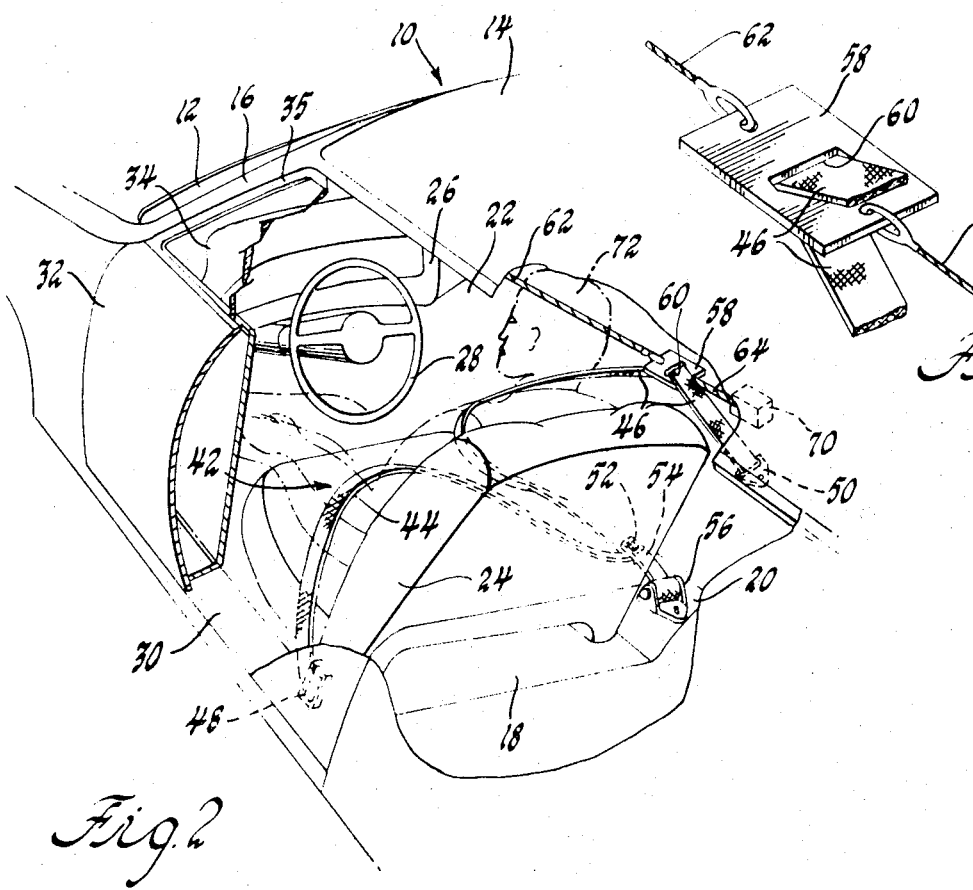
FIG. 2 is a view similar to FIG. 1 showing the door in closed position where the lap and shoulder belts are positioned in respective restraining positions relative to a phantom line indicated seated occupant.
Figure 3:
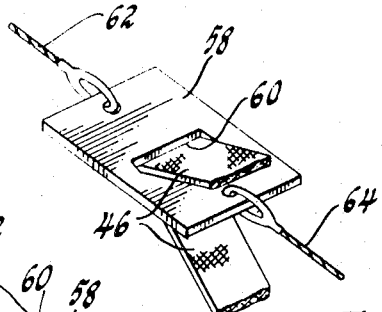
FIG. 3 is an enlarged view of a control member shown in FIGS. 1 and 2 in forward and rearward positions, respectively, and which is moved forwardly during door opening movement by a cable attached to the door to provide the impetus for moving both the lap and shoulder belts forwardly to the easy-enter positions.

An elongated generally rectangular control member 58, see FIG. 3, includes an aperture 60 slidably receiving an intermediate portion of shoulder belt 46 between attachment member 50 and the stitching at 52 of the inboard belt end to lap belt 44 and control belt 54. The opposite ends of control member 58 attach respective ends of first and second cables 62 and 64 which control the longitudinal position of control member 58 with respect to vehicle body 10 in response to door movement. The other end of the first cable 62 is secured to the window frame 35 of door 32 by an attachment 66 while an intermediate portion of the cable slides through an apertured portion 68 of the roof rail adjacent the upper end of windshield pillar 16. The other end of the second cable 64 is received by a suitable cable retractor mechanism 70 suitably mounted on roof 14 adjacent attachment member 50. During door opening movement, the first cable 62 pulls the control member 58 forwardly to the FIG. 1 position as the second cable 62 is extended against the normal retracting bias of retractor mechanism 70. During door closing movement, the retracting bias of retractor mechanism 70 retracts the second cable 64 to move the control member 58 rearwardly to the FIG. 2 position as the first cable 62 is pulled back through the apertured portion 68 of the roof rail.

When door 32 is in the FIG. 2 closed position with control member 58 positioned in the rearward position, control belt 54 is retracted by belt retractor 56 to position the lap and shoulder belts 44 and 46 in restraining positions respectively across the lap and chest of a phantom line indicated seated occupant 72. During door opening movement, the door mounted belt retractor 48 moves outwardly and forwardly of the vehicle body 10 to move the outboard end of the lap belt 44 forwardly as the belt is extended from the belt retractor. Concomitant with this movement, the forwardly moving control member 58 slides along and pulls the shoulder belt 46 forwardly to an easy-enter position. The shoulder belt 46 is tensioned as it moves forwardly to cause extending movement of control belt 54 from belt retractor 56, the net effect being to move the inboard ends of lap and shoulder belts 44 and 46 forwardly and upwardly such that the lap belt moves to an easy-enter position along with the shoulder belt. With the shoulder and lap belts in the easy-enter positions, seat 24 is readily accessible to an occupant entering or leaving the vehicle body 10. When an occupant assumes a seated position on seat 24 and door 32 is subsequently moved toward the closed position, the control member 58 moves rearwardly in the manner previously described such that belt retractor 56 retracts control belt 54 and moves the inboard ends of shoulder and lap belts 44 and 46 rearwardly and downwardly. Concomitant with the retraction of the control belt 54, the belt retractor 48 retracts the lap belt 44 such that the shoulder and lap belts are disposed in the occupant restraining positions without any deliberate occupant effort.

The invention thus provides an improved vehicle body passive belt arrangement.

What is claimed is:

1. In combination with a vehicle body having a door movable between open and closed positions laterally adjacent a seat mounted within the occupant compartment of the vehicle body, a passive belt arrangement for restraining a seated occupant comprising, a shoulder belt including an outboard end secured adjacent an upper outboard portion of the seat and adaptable to extend downwardly and inwardly from the outboard end across the chest of the occupant in a restraining position, a lap belt including an outboard end secured to the vehicle door and adaptable to extend across the lap of the occupant in a restraining position, attachment means secured to the inboard ends of the belts and normally biasing these belt ends to a lower rearward position to maintain the belts in the restraining positions while selectively allowing movement thereof to an upper forward position, control means movable forwardly and rearwardly relative to the vehicle body generally adjacent the upper edge of the vehicle body door opening which receives the door in closed position, the control means slidably receiving an intermediate portion of the shoulder belt, and actuating means attached to the control means and operatively associated with the door so as to move the control means forwardly in response to door opening movement and rearwardly in response to door closing movement, the shoulder belt moving fowardly in response to the forward movement of the control means while sliding therethrough such that the inboard ends of both the belts move to the upper forward position against the bias of the attachment means and so both belts are positioned in easy-enter positions when the door is in open position, and the bias of the attachment means moving the inboard belt ends to the lower rearward position as the control means moves rearwardly with the shoulder belt sliding therethrough to thereby position both belts in the occupant restraining positions when the door is in closed position.

2. In combination with a vehicle body having a door movable between open and closed positions laterally adjacent a seat mounted within the occupant compartment of the vehicle body, a passive belt arrangement for restraining a seated occupant comprising, a shoulder belt including an outboard end secured adjacent an upper outboard portion of the seat and adaptable to extend downwardly and inwardly from the outboard end across the chest of the occupant in a restraining position, a lap belt including an outboard end secured to the vehicle door and adaptable to extend across the lap of the occupant in a restraining position, a control belt including a first end secured to the inboard ends of the lap and shoulder belts, belt retractor means adjacent a lower inboard portion of the seat and normally retracting the second end of the control belt to maintain the lap and shoulder belts in the restraining positions, control means movable forwardly and rearwardly relative to the vehicle body generally adjacent the upper edge of the vehicle body door opening which receives the door in closed position, the control means slidably receiving an intermediate portion of the shoulder belt, and actuating means attached to the control means and operatively associated with the door so as to move the control means forwardly in response to door opening movement and rearwardly in response to door closing movement, the shoulder belt moving forwardly in response to the forward movement of the control means while sliding therethrough such that the inboard ends of both belts move forwardly and upwardly to extend the control belt from the belt retractor means and to position both belts in easy-enter positions when the door is in open position, and the bias of the belt retractor means retracting the control belt as the control means moves rearwardly with the shoulder belt sliding therethrough to thereby position both belts in the occupant restraining positions when the door is in closed position.

3. In combination with a vehicle body having a door movable between open and closed positions laterally adjacent a seat mounted within the occupant compartment of the vehicle body, a passive belt arrangement for restraining a seated occupant comprising, a shoulder belt including an outboard end secured adjacent an upper outboard portion of the seat and adaptable to extend downwardly and inwardly from the outboard end across the chest of the occupant in a restraining position, a lap belt adaptable to extend across the lap of the occupant in a restraining position, door mounted belt retractor means receiving the outboard end of the lap belt, a control belt including a first end secured to the inboard ends of the lap and shoulder belts, belt retractor means adjacent a lower inboard portion of the seat and normally retracting the second end of the control belt while the door mounted retractor means retracts the outboard end of the lap belt to maintain the lap and shoulder belts in the restraining positions, a control member slidably receiving an intermediate portion of the shoulder belt and having respective ends of first and second cables attached thereto, means attaching the other end of the first cable to the door and slidably receiving an intermediate portion of the cable adjacent a forward portion of the door opening to move the control member forwardly during door opening movement, the shoulder belt sliding through the forwardly moving control member and moving forwardly to an easy-enter position while extending the control belt from the associated belt retractor means to move the inboard ends of the lap and shoulder belts forwardly and upwardly and concomitantly move the lap belt forwardly to an easy-enter position as the door mounted belt retractor means extends the outboard end of the lap belt, and cable retractor means receiving the other end of the second cable and retracting this cable during door closing movement to move the control member rearwardly, the belt retractor means inboard of the seat retracting the control belt as the control member moves rearwardly to move the inboard ends of the lap and shoulder belts to a lower rearward position as the door mounted retractor means retracts the outboard end of the lap belt and the lap and shoulder belts move to the restraining positions.

4. The combination of claim 3 wherein one of the belt retractor means is an inertia belt retractor.

5. The combination of claim 3 wherein one of the belt retractor means is a belt retractor that is locked against belt extending movement in response to the position of the bolt of a door lock assembly associated with the door.

6. The combination of claim 3 wherein one of the belt retractor means is a belt retractor that is locked against belt extending movement in response to the position of an inside remote release handle associated with a door lock assembly of the door.

7. The combination of claim 3 wherein one of the belt retractor means is a belt retractor that is locked against belt extending movement in response to the positions of the inside remote release handle and the bolt associated with a door lock assembly of the door.

* * * * *